United States Patent Office 2,798,091
Patented July 2, 1957

2,798,091

PREPARATION OF β-FLUOROCARBOXYLIC ACIDS

Julian M. Mavity, Hinsdale, Ill., assignor to Universal Oil Products Company, Des Plaines, Ill., a corporation of Delaware No Drawing. Application July 19, 1954,
Serial No. 444,370

10 Claims. (Cl. 260—533)

This invention relates to a method of preparing organic acids, and more particularly to a process of preparing organic acids by condensing an olefinic hydrocarbon with carbon dioxide in the presence of a catalyst.

Organic acids, and more particularly, aliphatic acids of a relatively higher order have heretofore been prepared by many various methods. For example, these acids have been prepared by reducing hydroxy-substituted carboxylic acids or by oxidizing the corresponding alcohols. Another process for preparing aliphatic carboxylic acids has been to condense an olefinic hydrocarbon with carbon monoxide and steam in the presence of various catalysts such as boron phosphate, ammonium chloride, volatile inorganic acids, activated charcoal, etc.

It is therefore an object of this invention to provide a novel method for preparing organic acids by condensing an olefinic hydrocarbon and carbon dioxide in the presence of a catalyst.

A further object of this invention is to provide a relatively inexpensive, novel method of preparing fluoro-substituted organic acids by reacting an olefin with carbon dioxide in the presence of a catalyst comprising anhydrous hydrogen fluoride.

One embodiment of this invention resides in a process for preparing an organic acid by reacting an olefinic hydrocarbon with carbon dioxide in the presence of a hydrogen halide, and recovering the organic acid.

A further embodiment of this invention resides in a process for preparing an organic acid by condensing an olefinic hydrocarbon with an excess of carbon dioxide in the presence of a catalyst comprising anhydrous hydrogen fluoride, boron fluoride, and a contact material, and recovering the organic acid.

A more specific embodiment of this invention resides in a process for preparing β-hydroxypropionic acid by condensing ethylene with an excess of carbon dioxide in the presence of a catalyst comprising anhydrous hydrogen fluoride, boron fluoride, and aluminum fluoride, at a temperature in the range of from about 0° to about 40° C., hydrolyzing the resultant β-fluoropropionic acid, and recovering β-hydroxypropionic acid.

Other objects and embodiments of this invention referring to alternative olefinic hydrocarbons and to alternative catalyst will be found in the following further detailed description of this invention.

This invention is concerned with a novel method of preparing halo-substituted organic acids by reacting an olefinic hydrocarbon with carbon dioxide in the presence of a catalyst comprising an anhydrous hydrogen halide such as hydrogen fluoride and boron fluoride with or without the presence of a contact material. By using carbon dioxide in place of the prior art methods hereinbefore discussed which use carbon monoxide and steam, the process of preparing organic acids is hereby simplified due to the abolition of the step of passing steam through the reaction mixture. This simplifies the apparatus required for the process and dispenses with the ordinarily higher temperatures which are required for the previous reactions. In addition, the products of the prior art method differ from those of the present process, inasmuch as the products of the latter comprise halo-substituted organic acids. The starting materials in this process, namely, the olefinic hydrocarbon and the carbon dioxide, can be obtained from any number of readily available sources. For example, ethylene, propylene and other olefins may be found in gases which are a by-product of cracking petroleum. Carbon dioxide may be prepared by passing air through a red hot bed of coke, or it may be concentrated from other gases such as water gas. The availability and low cost of the starting materials as well as the simplification of the apparatus required greatly enhances the desirability of the present process.

Olefinic hydrocarbons which may be used in the process of this invention include ethylene and homologues thereof such as propylene, butene-1, butene-2, pentene-1, pentene-2, styrene, allylbenzene, isoallylbenzene, etc.

Catalysts which activate the conversion of the olefin to the β-halocarboxylic acid comprise an anhydrous hydrogen halide such as hydrogen fluoride, hydrogen bromide, hydrogen chloride, hydrogen iodide, which may, if so desired, be composited with boron fluoride. The catalyst may or may not also include a contact catalyst material such as finely divided nickel, nickel fluoride, ferrous fluoride, ferric fluoride, cobalt fluoride, manganese fluoride, etc.

The temperature at which the reaction of the present invention occurs is relatively low, ranging from about 0° to about 100° C. or more, and preferably in the range of from about 0° to 40° C., depending upon the particular catalyst and reactant employed in the process. For example, when hydrogen fluoride admixed with boron fluoride comprises the catalyst, and said catalyst is composited with a contact material which has a relatively great promoter effect, the temperature at which the reaction will proceed will be in the range of from about 0° to about 40° C. due to the relatively high activity of catalyst mixture. However, when a contact material of lesser promoter effect is used along with the catalyst comprising hydrogen fluoride and boron fluoride, the temperature will be correspondingly higher, that is, in the range of from about 40° C. to about 100° C. or more, due to the aforesaid relatively lesser activity of the resulting catalyst composite. The pressure at which the reaction of the present process proceeds will be in the range of from about 5 atmospheres to about 1000 atmospheres or more, said pressure being high enough to maintain the carbon dioxide of the reaction in liquid phase. In the process of the present invention, as hereinbefore stated, it is preferable to use catalysts which will enable the reaction to occur at a low temperature, for example, below approximately 30° C. in order that the carbon dioxide be maintained in said liquid state.

In order that the formation of an alkyl fluoride corresponding to the olefin or the polymerization of the olefin is minimized, the carbon dioxide should be present in the reaction mixture in a large excess as compared with the olefinic hydrocarbon, the ratio of carbon dioxide to the olefinic hydrocarbon being in the range of from about 10:1 to about 20:1.

After the β-fluorocarboxylic acid such as β-fluoropropionic acid, β-fluorobutyric acid, β-fluoroisobutyric acid, β-fluoropentanoic acid is formed, the acid may, if so desired, be hydrolyzed by conventional means, for example, by treating said compound with an alcoholic solution of potassium hydroxide, sodium hydroxide, etc. thus converting the β-fluorocarboxylic acid to the corresponding hydroxy acid.

The process of the present invention may be effected in any suitable manner and may comprise either a batch or continuous type operation. When a batch type operation is used, carbon dioxide, ethylene and boron fluoride are passed into a conversion apparatus such as a rotating autoclave which contains a catalyst comprising hydrogen fluoride along with a suitable contact material. The autoclave is heated or cooled to the desired temperature for a predetermined length of time after which it is allowed to return to room temperature and the $\beta$-fluorocarboxylic acid is separated by conventional means, for example, by fractional distillation under reduced pressure. The separated $\beta$-fluorocarboxylic acid may then be placed in a second reactor, or returned to the first reactor and subjected to the action of a hydrolyzing agent to remove the fluorine and convert the compound to a hydroxy-substituted organic acid.

Another method of operation comprises a continuous type operation. The olefinic hydrocarbon such as ethylene is continuously charged to a reactor maintained at suitable operating conditions of temperature and pressure. The reactor may comprise an unlined vessel or coil, or it may be lined with a solid absorbent material such as alumina, dehydrated bauxite and the like. The carbon dioxide is also continuously charged to this reactor as is the catalyst comprising hydrogen fluoride-boron fluoride. At the end of the desired residence time, the $\beta$-fluorocarboxylic acid is continuously withdrawn and may be charged to a second reactor containing the hydrolyzing agent where the $\beta$-fluorocarboxylic acid may undergo hydrolysis to form the corresponding $\beta$-hydroxy organic acid.

The following examples are given to illustrate the process of the present invention which, however, are not intended to limit the generally broad scope of the present invention in strict accordance therewith.

*Example I*

A stream of carbon dioxide and a stream of ethylene in a carbon dioxide-ethylene ratio of about 15:1 is passed into a rotating autoclave containing a hydrogen fluoride-boron fluoride-ferric fluoride catalyst, after which the autoclave is cooled to a temperature of approximately 0° C. At the end of approximately 5 hours the autoclave and the contents thereof is allowed to return to room temperature and the $\beta$-fluoropropionic acid is separated by conventional means, for example, by fractional distillation under reduced pressure.

*Example II*

A stream of carbon dioxide and a stream of propylene in a carbon dioxide-propylene ratio of about 17:1 is passed into an autoclave containing a catalyst similar to that hereinbefore set forth in Example I. The $\beta$-fluorobutyric acid may be subjected to an alcoholic solution of potassium hydroxide and $\beta$-hydroxyisobutyric acid recovered therefrom.

I claim as my invention:

1. A process for producing a beta-fluorocarboxylic acid which comprises subjecting a normally gaseous olefinic hydrocarbon and carbon dioxide, in a ratio of $CO_2$ to olefin of from about 10:1 to about 20:1, to the action of anhydrous hydrogen fluoride at a reaction temperature of from about 0° to about 100° C. and a pressure of from about 5 to about 1000 atmospheres.

2. The process of claim 1 further characterized in that said olefinic hydrocarbon is ethylene.

3. The process of claim 1 further characterized in that said olefinic hydrocarbon is propylene.

4. A process for producing a beta-fluorocarboxylic acid which comprises subjecting a normally gaseous olefinic hydrocarbon and carbon dioxide, in a ratio of $CO_2$ to olefin of from about 10:1 to about 20:1, to the action of anhydrous hydrogen fluoride and boron fluoride at a reaction temperature of from about 0° to about 100° C. and a pressure of from about 5 to about 1000 atmospheres.

5. The process of claim 1 further characterized in that the reaction is effected in the presence of a contact material selected from the group consisting of metallic nickel and fluorides of nickel, iron, cobalt and manganese.

6. A process for producing a beta-fluorocarboxylic acid which comprises subjecting carbon dioxide and an olefinic hydrocarbon selected from the group consisting of ethylene and propylene, in a ratio of $CO_2$ to olefin of from about 10:1 to about 20:1, to the action of anhydrous hydrogen fluoride and boron fluoride at a reaction temperature of from about 0° to about 100° C. and a pressure of from about 5 to about 1000 atmospheres and in the presence of a contact material selected from the group consisting of metallic nickel and fluorides of nickel, iron, cobalt and manganese.

7. A process for producing beta-fluoropropionic acid which comprises subjecting ethylene and carbon dioxide, in a ratio of $CO_2$ to ethylene of from about 10:1 to about 20:1, to the action of anhydrous hydrogen fluoride and boron fluoride at a reaction temperature of from about 0° to about 100° C. and a pressure of from about 5 to about 1000 atmospheres.

8. A process for producing beta-fluorobutyric acid which comprises subjecting propylene and carbon dioxide, in a ratio of $CO_2$ to propylene of from about 10:1 to about 20:1, to the action of anhydrous hydrogen fluoride and boron fluoride at a reaction temperature of from about 0° to about 100° C. and a pressure of from about 5 to about 1000 atmospheres.

9. A process for producing beta-fluoropropionic acid which comprises subjecting ethylene and carbon dioxide, in a ratio of $CO_2$ to ethylene of from about 10:1 to about 20:1, to the action of anhydrous hydrogen fluoride, boron fluoride and ferric fluoride, at a reaction temperature of from about 0° to about 100° C. and a pressure of from about 5 to about 1000 atmospheres.

10. A process for producing beta-fluorobutyric acid which comprises subjecting propylene and carbon dioxide, in a ratio of $CO_2$ to propylene of from about 10:1 to about 20:1, to the action of anhydrous hydrogen fluoride, boron fluoride and ferric fluoride at a reaction temperature of from about 0° to about 100° C. and a pressure of from about 5 to about 1000 atmospheres.

References Cited in the file of this patent

UNITED STATES PATENTS 2,053,233     Woodhouse _____ Sept. 1, 1936

OTHER REFERENCES

Guest: J. Am. Chem. Soc., v. 69 (1947), 300.
Wagner et al.: "Synthetic Organic Chemistry," pp. 170-1 (1953).